Patented Apr. 28, 1936

2,038,678

UNITED STATES PATENT OFFICE 2,038,678

CLARIFICATION OF CELLULOSE ETHER SOLUTIONS

George A. Richter, Harold P. Vannah, and Royal H. Rasch, Berlin, N. H., assignors to Brown Company, Berlin, N. H., a corporation of Maine No Drawing. Application February 7, 1934, Serial No. 710,178

3 Claims. (Cl. 260—152)

This invention relates to the clarification of cellulose ether solutions and more particularly of aqueous solutions of the hydroxy-cellulose ethers, for instance, solutions of the hydroxy methyl, ethyl, propyl, butyl, or other hydroxy alkyl ethers of cellulose.

After cellulose has been etherified, it is customary practice to dissolve the ether in caustic soda solution to form a syrup or solution from which the ether is regenerated as in the form of filaments, films, etc., by the action of suitable and regenerating reagents. It is, however, difficult to form aqueous cellulose ether solutions of perfect clarity and sparkle for the reason that there is invariably a slight residuum of cellulose either in unetherified or etherified form that resists going into aqueous solution. This is true even when the etherified cellulose is peptized or activated so as to go into solution more rapidly and completely. Thus, after cellulose has been etherified, it is sometimes the practice to freeze the ether in the presence of caustic soda solution and then to thaw out the mass while it is being ground, as the solubility of the ether both as regards rate and extent is thereby greatly increased. No matter how carefully such peptizing or activating practice is performed, however, the solution of peptized ether in caustic soda solution of say, 7% to 8% strength, eventuates in a syrup wherein there is a residue of undissolved finely divided cellulose in unetherified and/or in etherified form, which, although slight, is none the less sufficient to cause haziness in the syrup, interfere with its filtration, and detract from the quality of the filaments, films, etc., made from the syrup.

We have found that haziness and its difficulties in caustic soda solutions of the vellulose ethers may be obviated by adding carbon bisulphide to such solutions. Indeed, we have found that not only does the addition of but a small amount of carbon bisulphide to such solutions bring about their clarification, but further that their stability is enhanced so that they have less tendency to gel upon storage for several weeks. The increased stability may possibly be traceable to the elimination of nuclei or "seeds" about which gel formation starts and grows. The addition of carbon bisulphide to such solutions brings about a xanthation of the residuum of undissolved cellulose and/or cellulose ether and a solution of such residuum in the form of the xanthate.

As an illustration of a prefered practice falling within the purview of the present invention, we might cite the following one that relates to the preparation of a clear solution of the hydroxy ethyl ether of cellulose. Any suitable cellulose pulp, say a mercerized wood pulp of high alpha cellulose content and low solution viscosity, may be used as raw material. The pulp may be etherified in an autoclave under controlled temperature conditions by introducing ethylene oxide vapor in controlled amount into the autoclave while the pulp is preferably being mixed or tumbled so as to expose fresh fiber surfaces to the ethylene oxide and thereby ensure a uniform reaction. A small amount of pyridine or other accelerator of etherification is preferably initially admixed with the pulp. The fibrous ether resulting from the reaction is then preferably peptized or activated for solution by mixing with caustic soda solution, freezing, and thawing out the mixture while it is being ground. The activated mixture is then dissolved in a caustic soda solution of, say, 7% to 8% strength, as under these conditions a concentration of about 8% of the ether can be dissolved while at the same time arriving at a solution or syrup possessed of the appropriate fluidity and other qualities for spinning into filaments, casting into films, etc. The resulting solution having a causticity and an ether content of, say, about 7% to 8%, each, is characterized by a distinct turbidity or cloudiness, but upon adding only about 1% more or less of carbon bisulphide by weight to the solution, we have found that the solution clears up and assumes a sparkling quality.

Solutions of the ethers prepared in accordance with our invention are hence admirably adapted for making filaments, films, etc., for coating and/or impregnating paper, cloth, and other fabrics, and for various other purposes. As ordinarily, the setting or regeneration of the ether may be accomplished with suitable acid solution, for instance, a sulphuric acid solution of sodium sulphate, which simultaneously causes a regeneration of the cellulose from such xanthate as is present in the ether solution. In view of the slight content of xanthate in the ether solution, it is unnecessary to put the regenerated ether through the desulphurizing or other purifying treatments generally performed on cellulose regenerated from a xanthate for the purpose of removing sulphur or other impurities, particularly when the ether solution is employed for such purposes as coating and/or impregnating paper, cloth or other fabrics.

In some instances, the carbon disulphide may be added to the ether while it is in solid fibrous condition and before it has been peptized or activated preparatory to being dissolved in caustic soda solution. In such case, there is not only reaction between the carbon bisulphide and the unetherified fibers but also some reaction with the etherified fibers, in consequence of which the final solution contains not only the hydroxy-cellulose ether but also some xanthated cellulose and xanthated hydroxy-cellulose ether. When the solution or syrup contains a significant amount of xanthated constituents, the filaments, films, or other end-products made therefrom may be subjected to desulphurizing or other purifying treatment. We have found that not only are the xanthated constituents compatible as solutes in the same solution with the ether but that the filaments, films, or other end-products made from the solution are improved, particularly in their wet strength. We have substantiated this finding by admixing already-prepared viscose syrup and ether solution. The enhanced wet strength of end-products made from such a mixture evidently arises from the fact that cellulose regenerated from viscose syrup has wet strength considerably higher than that of hydroxy-cellulose ether regenerated from hydroxy-cellulose ether solution. So far as we are aware, we are the first to discover the advantages of working with solutions of hydroxy-cellulose ethers containing xanthated cellulose and/or xanthated hydroxy-cellulose ethers. In speaking about hydroxy-cellulose ethers we mean to include ethers whereinto various alkyl radicals, such as methyl, ethyl, propyl, butyl, etc., may enter.

We claim:

1. A process which comprises etherifying a batch of cellulose to form a hydroxy-cellulose ether, dissolving the etherified batch in caustic soda solution, and xanthating substantially only such undissolved cellulose and ether as resist the dissolving action of the caustic soda solution and would otherwise tend to remain suspended in the solution and cause cloudiness therein, thereby clarifying the solution.

2. A process which comprises etherifying a batch of cellulose to form a hydroxy-cellulose ether, dissolving the etherified batch in caustic soda solution, and adding carbon bisulphide to the resulting ether solution in amount designed to xanthate substantially only undissolved cellulose and ether and thereby to clarify the solution.

3. A process which comprises etherifying a batch of cellulose to form a hydroxy-cellulose ether, dissolving the etherified batch in caustic soda solution, and adding carbon bisulphide to the resulting ether solution in an amount not exceeding about 1%, based on the weight of the solution, to xanthate substantially only undissolved cellulose and ether and thereby to clarify the solution.

GEORGE A. RICHTER.
HAROLD P. VANNAH.
ROYAL H. RASCH.